G. H. HILL.
REGENERATIVE BRAKING.
APPLICATION FILED SEPT. 18, 1916.
1,281,959.
Patented Oct. 15, 1918.
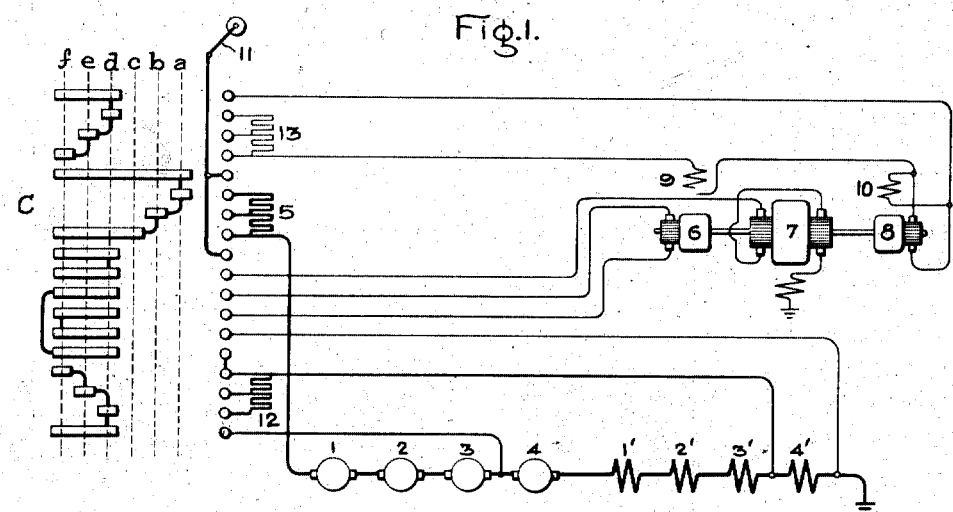
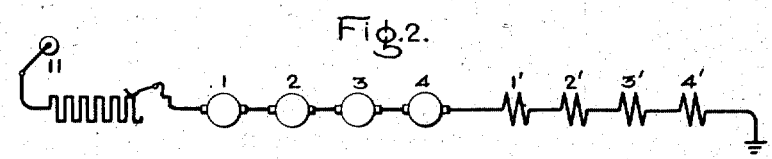
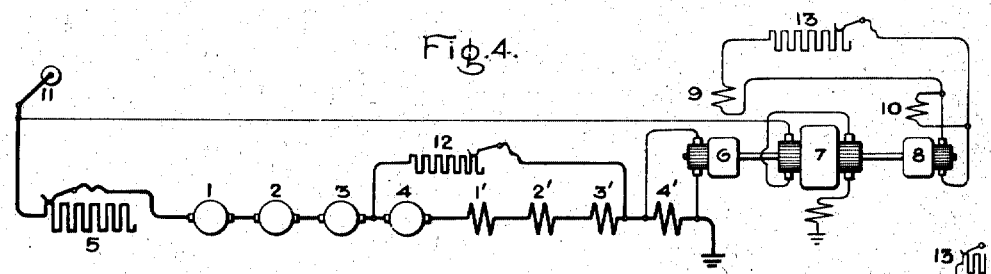
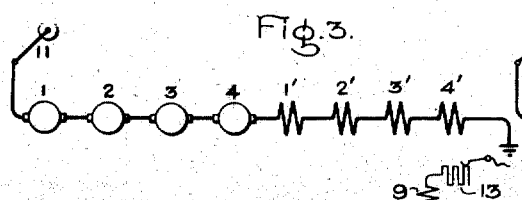
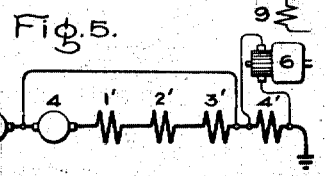
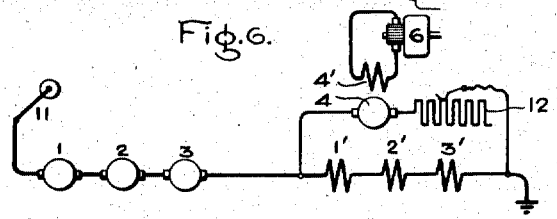
Inventor:
George H. Hill,
by Albert G. Davis
His Attorney.

UNITED STATES PATENT OFFICE.

GEORGE H. HILL, OF SCHENECTADY, NEW YORK, ASSIGNOR TO GENERAL ELECTRIC COMPANY, A CORPORATION OF NEW YORK.

REGENERATIVE BRAKING.

1,281,959.

Specification of Letters Patent.

Patented Oct. 15, 1918.

Application filed September 18, 1916. Serial No. 120,667.

*To all whom it may concern:*

Be it known that I, GEORGE H. HILL, a citizen of the United States, residing at Schenectady, county of Schenectady, State of New York, have invented certain new and useful Improvements in Regenerative Braking, of which the following is a specification.

My invention relates to the control of electric motors and has for its object the provision of improved means whereby an electric motor may be started, stopped and generally controlled in a reliable, safe and efficient manner.

More specifically, my invention relates to the control of direct current motors, one of the objects being to provide improved means whereby an electric motor may be retarded by causing it to act as a generator to return energy to the line. While my invention is of general application in the field of motor control, it is particularly applicable to electric traction systems. In the operation of trains on heavy grades, one of the great problems is the braking of the train. In some instances with the usual air brakes on long grades, brake shoes will be overheated or destroyed in a single trip. The wear on the rails is also a matter of serious consideration. Furthermore, trouble is oftentimes caused by overheating the wheels. It has heretofore been proposed to brake electrically operated trains at least in part by causing the motors to act as generators and return energy to the line, a form of braking commonly known as "regenerative" braking. Certain difficulties, however, have been encountered in the use of such systems by reason of the almost universal use in traction work of series motors which are not satisfactory for regenerative braking, if operated as straight series generators, because of their unstable characteristics under conditions of variable speed or variable line voltage. Various arrangements have been heretofore proposed for overcoming these difficulties but these have for the most part been quite complicated and expensive and are often objectionable because of the practical difficulties which arise during their operation. The trolley or line voltage of traction systems generally varies over a considerable range but on a direct current regenerative system this range is very pronounced at times because of the effect which the locomotives or trains have on the voltage. Because of this fluctuating line voltage it has been difficult to keep the regenerative current within safe limits during the braking operation and, at the same time, to permit a desirable speed for the locomotive or train and to have the braking effort entirely under the control of the operator. One of the objects of my invention is to provide an improved control which automatically takes care of the fluctuating line voltage whereby the operator may obtain the desired train speed during the regenerative braking period and the desired degree of braking at all times without danger to the motors or other apparatus due to excessive current.

In carrying my invention into effect I control the regenerative braking effect by furnishing a separate excitation for a portion of the motors and then use this portion to vary the excitation of the other motors by connecting it in a closed loop with the fields of the other motors, maintaining the connection of these motors with each other and with the source of supply the same as in motoring. The separate excitation for this portion of the motors may be obtained in any suitable manner, but I prefer to obtain it by means of a small generator which is driven by a motor energized from the source of supply for the locomotive or train. The regenerative braking effect is accurately controlled by varying the excitation of this small generator in any suitable manner or by varying a resistance in the closed loop in which the armature of the separately excited portion of the motors and the fields of the other motors are included or by varying both the excitation of this small generator and the resistance in the closed loop.

Referring to the drawings, Figure 1 shows a system of motor control embodying my invention; Fig. 2 shows a diagram of circuit connections for the motors on the first point motoring; Fig. 3 shows a diagram of circuit connections for the motors on the last point motoring; Fig. 4 shows a diagram of circuit connections for the motors on the first point of regenerative braking; Figs. 5 and 6 show diagrams of circuit connections for modified systems of regenerative braking embodying my invention.

Referring to Fig. 1 the controller C having a plurality of circuit making contacts is adapted to connect the motors and control apparatus in the various relations as shown in Figs. 2, 3 and 4. The motors having the armatures 1, 2, 3, 4, and series fields 1', 2', 3', and 4' respectively are adapted to be included in series in all the steps of the control. The variable resistance 5 is adapted to be included in the motor circuits during starting and to be controlled by means of the controller C. The series field 4' of the motor having the armature 4 is supplied with a separate excitation during the regenerative braking steps in the motor control by means of a generator 6 of a motor generator set having a motor 7 energized from the source of supply. A small generator 8 driven by the motor 7 of the motor generator set is adapted to supply the excitation for the field 9 of the generator 6 and its own shunt field 10.

The operation of this arrangement is as follows:—

When it is desired to start the locomotive or train the controller C is turned to the first point a thus connecting all the motors in series with all of the starting resistance 5 included in the circuit, the connection of the motors being as shown in Fig. 2. The circuit at this point is from the trolley pole 11 which is connected to the source of supply, through the controlling resistance 5, the armatures 1, 2, 3, 4, and their respective series fields 1', 2', 3', 4', to ground. By turning the controller to the position b one section of the accelerating resistance 5 is short circuited thus increasing the speed of the motors, and by turning the controller to the position c the resistance 5 is all short circuited and the motors are connected directly in series across the line. When it is desired to brake the locomotive or train the controller is moved to the position d, when the series field 4' is given a separate excitation by means of the generator 6 of the motor generator set. At the same time the armature 4 of this motor is connected in a closed loop with the fields 1', 2', and 3' of the other motors. By means of a variable resistance 12, included in this closed loop, the motor 4 may be operated at voltages approximating its normal rated voltage and hence be caused to develop a braking effect approximating that developed by the other motors. The resistance 12, which is traversed by the regenerated current traversing the motors 1, 2, and 3, also functions to limit the fluctuation in the regenerated current, upon sudden variations in the supply circuit voltage, both by varying the portion of the voltage developed by the motors 1, 2, and 3 consumed therein and by varying the portion of the voltage of the motor 4 consumed therein, thereby varying the current in the field windings 1', 2', and 3' and hence the voltage developed by the motors 1, 2 and 3. By varying the resistance 12, the braking effect of the motors 1, 2, and 3 and also of the motor 4 may be varied. A variable resistance 13 in the shunt field of the generator 6 is provided for varying the voltage of this generator and thus the excitation of the field winding 4'. Although means comprising the controller C are shown in Fig. 1 for varying the resistances 12 and 13 simultaneously and in the same sense, my invention is in no way limited to varying these resistances in this particular manner. The circuit connections corresponding to the position d of the controller C are shown in Fig. 4. It will be noticed that the connections between the motors and the source of supply have been maintained and that one of the motors, the motor having the armature 4 and series field 4', is given a separate excitation by means of the generator 6 and the armature of this motor is connected in a closed loop with the series fields of the other motors, together with a resistance 12. In order to increase the regenerative braking effect the controller is moved to the position e when a portion of the resistance 12 in the closed loop is short circuited thus causing more current to flow through the closed loop including the armature 4' and series fields 1', 2', 3', giving these fields a greater excitation. At the same time a portion of the resistance 13 in the shunt field 9 of the generator 6 is short circuited, thus increasing the voltage of this generator and increasing the excitation of series field 4' and in this way raising the voltage of the armature 4 and increasing the excitation of the series fields 1', 2', and 3'. Increasing the excitation of the fields 1', 2', and 3' causes higher voltage to be developed in the armatures 1, 2, and 3, providing the speed thereof does not decrease, and, if the same or a greater current be caused to flow therein, a greater braking effect will be produced thereby. The maximum regenerative braking effect is obtained by turning the controller to the position f short circuiting all of the resistances 12 and 13. By reason of the stabilizing action of the resistance 12, it will ordinarily be preferable to operate with a portion thereof effective.

A modified form of my invention is shown in Fig. 5. This system is the same as that shown in Figs. 1 and 4 with the exception that the resistance 12 in the closed loop including the armature 4 and the fields 1', 2', 3' has been omitted. The regulation of the regenerative effect in this system is obtained entirely by varying the excitation of the small generator 6, and the resistance of the closed loop is not varied. An arrangement such as shown in this figure is entirely satisfactory for some situations where the regenerative braking must be controlled, but does not afford such an accurate or safe regulation as that shown in the other figures. In the modifications illustrated in Figs. 1 to 5 inclusive, the armature 4 is not traversed by the current traversing the armatures 1, 2, and 3 and hence the latter may be operated at full current capacity without an overload being imposed upon the armature 4.

Another modified form of my invention is shown in Fig. 6 in which the series connection is maintained between the armatures 1, 2, 3 and their respective series fields 1', 2' and 3' but the armature 4 is disconnected from this series connection and its series field 4' is also disconnected from the other motors. The series field 4' is separately excited by means of the generator 6 of the motor generator set running from the line, and the shunt field 9 of this generator is controlled in the same manner as the system shown in Figs. 4 and 5. The control of the excitation of the series fields 1', 2', and 3' may be effected by varying either the resistance 12, or the resistance 13, or both the resistance 12 and the resistance 13. The principal difference between the system of Fig. 6 and that of Figs. 1 to 4 is that, in the system of Fig. 6, the armature 4 is located so that it is traversed both by the current traversing the armatures 1, 2, and 3 and by the current traversing the fields 1', 2', and 3', while in the system of Figs. 1 to 4, the armature 4 is located so that it is traversed only by the current traversing the fields 1', 2', and 3'.

My arrangement gives, for some conditions, a more desirable speed control during braking than could be obtained with ordinary systems using four motors in series or an arrangement in which two motors in series are connected in parallel with two others in series. In arrangements using four motors in series which have heretofore been proposed it has been found to be impossible to get a higher speed than a certain value, for instance 20 miles per hour, without weakening the motor fields to such an extent as to render the motors unstable as generators. If the motors were connected two in series in parallel with two others in series it has been difficult to secure a low speed during regenerative braking because of the fact that with such a connection for a speed of, for instance, less than 30 miles per hour, the field current would have to be larger than the windings could stand without overheating. By my arrangement I am able to secure a speed which is midway between the highest safe speed of the four motor series connection and the lowest obtainable speed with the series parallel arrangement. My arrangement therefore inherently obviates the practical difficulties with those other arrangements which have been heretofore proposed. It will be further noticed that in my arrangement the separately excited motor which is used to furnish the excitation for the fields of the other motors also furnishes its quota of braking effect to retard the speed of the locomotive or train, and with the resistance 12 included in the closed loop, the armature 4 may be working at somewhere near its normal rating. A further advantage of my arrangement is that fluctuations of voltage on the line are automatically taken care of, since the voltage of the generator and the voltage of the armature 4 are responsive to the voltage of the line and thus the regenerative braking is automatically varied in accordance with the line voltage.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:

1. The method of regenerative braking in a system comprising a plurality of series motors adapted to drive a common load, which consists in maintaining the connection between the series fields and armatures of a portion of said motors and the source of supply, separately exciting another portion of said motors, and connecting said last named portion in a local circuit with the field windings of the first named portion to thereby control their excitation.

2. The method of regenerative braking in a system comprising a plurality of series motors adapted to drive a common load, which consists in maintaining the connection between a source of supply and a portion of said motors, separately exciting the field windings of another portion of said motors to cause this portion to act as a generator, connecting said last named portion in a local circuit with the field windings of the first named portion of the motors, together with a resistance, and in then controlling the braking effect by varying said resistance.

3. The method of regenerative braking in a system comprising a plurality of series motors adapted to drive a common load, which consists in maintaining the connection between a source of supply and a portion of said motors, separately exciting the field windings of another portion of said motors to cause this portion to act as a generator and connecting said last named portion to a local circuit with the field windings of the first named portion of the motors, together with a resistance, and then controlling the braking effect by varying the excitation of said separately excited portion of the motors.

4. The method of regenerative braking in a system comprising a plurality of series motors adapted to drive a common load, which consists in maintaining the connection between a source of supply and a portion of said motors, separately exciting the field windings of another portion of said motors to cause this portion to act as a generator, connecting said last named portion in a local circuit with the field windings of the first named portion of the motors, together with a resistance, and in then controlling the braking effect by varying said resistance, and varying the excitation of said separately excited portion of the motors.

5. The method of regenerative braking in a system comprising a plurality of series motors adapted to drive a common load, which consists in maintaining the connection between the armatures of said motors and the source of supply, separately exciting a portion of said motors, and connecting said portion in a local circuit with the field windings of the other motors to thereby control their excitation.

6. The method of regenerative braking in a system comprising a plurality of series motors adapted to drive a common load, which consists in maintaining the connection between the armatures of said motors and a source of supply, separately exciting the field windings of a portion of said motors to cause said portion to act as a generator, connecting said portion in a local circuit with the field windings of another portion of said motors, together with a resistance, and in then controlling the braking effect by varying said resistance.

7. The method of regenerative braking in a system comprising a plurality of series motors adapted to drive a common load, which consists in maintaining the connection between the armatures of said motors and a source of supply, separately exciting the field winding of one of said motors, connecting said separately excited motor in a local circuit with the field winding of another of said motors, together with a resistance, and then controlling the braking effect by varying said resistance.

8. The method of regenerative braking in a system comprising a plurality of series motors adapted to drive a common load, which consists in maintaining the connection between said motors and a source of supply, separately exciting the field windings of a portion of said motors to cause said portion to act as a generator and connecting said portion in a local circuit with the field windings of the other motors, together with a resistance, and then controlling the braking effect by varying the excitation of said separately excited portion of the motors.

9. The method of regenerative braking in a system comprising a plurality of series motors adapted to drive a common load, which consists in maintaining the connection between said motors and a source of supply, separately exciting the field winding of one of said motors and connecting said separately excited motor in a local circuit with the field windings of the other motors, together with a resistance, to cause said motors to act as generators and then controlling the braking effect by varying the excitation of said separately excited motor.

10. The method of regenerative braking in a system comprising a plurality of series motors adapted to drive a common load, which consists in maintaining the connection between said motors and a source of supply, separately exciting the field windings of a portion of said motors to cause said portion to act as a generator, connecting said separately excited portion in a local circuit with the field windings of the other motors, together with a resistance, and in then controlling the braking effect by varying said resistance and varying the excitation of said separately excited portion of the motors.

11. The method of regenerative braking in a system comprising a plurality of series motors adapted to drive a common load, which consists in maintaining the connection between said motors and a source of supply, separately exciting the field winding of one of said motors, connecting the armature of the separately excited motor in a local circuit with the field windings of the other motors, together with the resistance, to cause said motors to act as generators, and in then controlling the braking effect by varying said resistance and varying the excitation of said separately excited motor.

12. In combination, a plurality of motors connected to a common load, means for connecting said motors to a source of supply to drive the load and means for connecting one of said motors as a separately excited generator arranged in a local circuit with the field windings of other of said motors, and for maintaining the connection between the armature and field windings of said other of said motors and the source of supply for regenerative braking.

13. In combination, a plurality of series motors connected to a common load, means for connecting said motors to a source of supply in order to drive the load and means for connecting one of said motors in a local circuit with the field windings of the other motors, while maintaining the connection of said field windings in series with their armatures to the source of supply, and for separately exciting said first named motor for regenerative braking.

14. Apparatus for regenerative braking, comprising a plurality of series motors connected to a common load, means for separately exciting the field winding of one of said motors, means for connecting the armatures of all of said motors and the remaining field windings in series with one another and to a source of supply, and a substantial resistance shunted around said field windings and the armature of that motor which is separately excited.

15. In combination, a plurality of motors connected to a common load, means for connecting said motors to a source of supply to drive the load or for connecting one of said motors as a separately excited generator in a local circuit with the field windings of another of said motors for braking, and for maintaining at all times the connection between the armatures of said motors and the source of supply.

16. In combination, a plurality of series motors connected to a common load, means for connecting said motors to a source of supply in order to drive the load or for connecting one of said motors in a local circuit with the field windings of the other motors, while maintaining the connection of all the field windings in series with their armatures to the source of supply, and for separately exciting said first named motor.

17. Apparatus for regenerative braking, comprising a plurality of series motors connected to a common load, means for separately exciting the field winding of one of said motors, means for connecting the armatures and field windings of all of said motors in series with one another and to a source of supply, and a substantial resistance shunted around the armature of that motor which is separately excited and the field windings of the other motors.

In witness whereof I have hereunto set my hand this 16th day of September, 1916.

GEORGE H. HILL.